No. 883,208. PATENTED MAR. 31, 1908.
M. LEITCH.
PROCESS OF SEPARATING INCOMBUSTIBLE MATERIALS HAVING DIFFERENT MELTING TEMPERATURES.
APPLICATION FILED SEPT. 28, 1904.
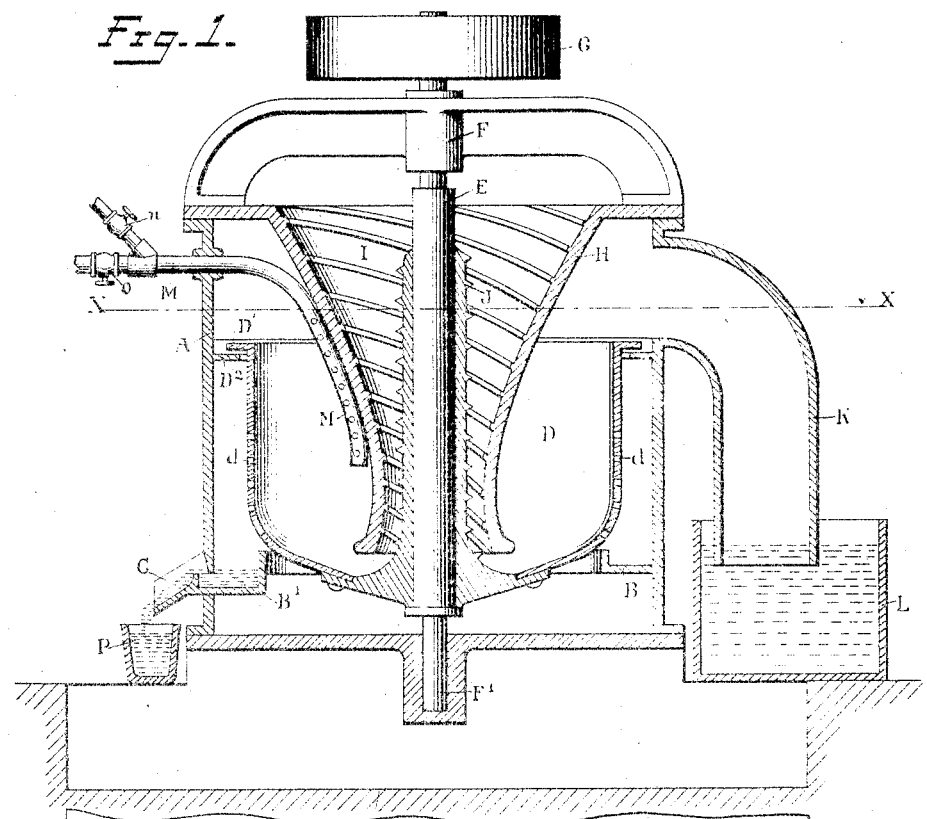
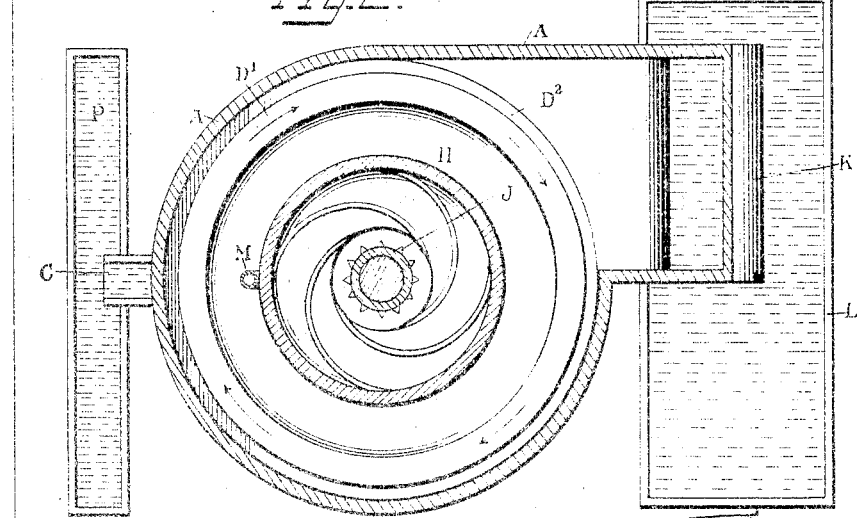

UNITED STATES PATENT OFFICE.

MEREDITH LEITCH, OF BROOKLYN, NEW YORK, ASSIGNOR, BY MESNE ASSIGNMENTS, TO METAL PROCESS COMPANY, A CORPORATION OF NEW YORK.

PROCESS OF SEPARATING INCOMBUSTIBLE MATERIALS HAVING DIFFERENT MELTING TEMPERATURES.

No. 883,208.     Specification of Letters Patent.     Patented March 31, 1908.

Original application filed April 2, 1904, Serial No. 201,230. Divided and this application filed September 28, 1904. Serial No. 226,305.

*To all whom it may concern:*

Be it known that I, MEREDITH LEITCH, a citizen of the United States, residing at Brooklyn, county of Kings, and State of New York, have invented certain new and useful Improvements in the Process of Separating Incombustible Materials of Different Melting Temperatures, of which the following is a full, clear, and exact description.

My invention relates to improvements in the process of separating incombustible materials of different melting temperatures, and has for its object to produce a simple and inexpensive process, and one in which the operation is very complete and which does not incur loss by reason of oxidation of the materials acted upon.

My invention is particularly applicable for separating solder from old tin cans and the like.

Heretofore attempts have been made to separate materials of these sorts by the simple heating of the mass to a degree sufficiently high to melt the incombustible material of low melting temperature and permit such melted material to flow from the incombustible material of high melting temperature under the action of gravity. In carrying out that process, however, it has been found that the action of gravity is by no means sufficient to cause the melted material to flow from the unmelted material, the result being that a great deal of the melted material adheres to the material of high melting temperature in the form of drops or globules and therefore fails to be separated therefrom. Moreover, the process referred to is not a continuous process, but one in which separate charges are treated one at a time.

Among the objects of my invention is to produce a continuous process which can be carried out without interruption for long periods of time.

Another object is to prevent the materials from being oxidized. Another is to secure practically a complete separation of the two materials.

My invention is applicable not only to separating solder from tin cans but also for separating native metals from their ores and other similar uses.

Although in carrying out my invention other separating forces may be relied on, I prefer to make use of centrifugal force, which can be made many times stronger than gravity or other forces which might be used.

The following is a description of apparatus that may be used to carry out my invention, reference being had to the accompanying drawings, in which Figure 1 is a vertical section of my apparatus, and Fig. 2 is a horizontal section on the line $x$—$x$, Fig. 1.

Referring more particularly to the drawings, A represents an inclosing wall provided with a gutter B and a spout C, the gutter having a trap B' formed at the spout for preventing the egress of products of combustion when filled with molten metal. Within the chamber formed by the wall A is a revolving basket or centrifugal separator D, preferably of steel, mounted upon the shaft E which is supported by bearings F F' and is driven by the pulley G. This basket D is provided with perforations $d$ in its sides for the purpose hereinafter described. The bearings F F' are of any well-known type suitable for use in connection with a vertical heated shaft.

Within the basket D extends a hopper H preferably conical in form as shown. This hopper forms a cover for the chamber formed by the wall A, being supported by the upper edge of said wall, so as to seal the upper part of the chamber. The hopper is provided with ribs I which coact with teeth J on the revolving sleeve surrounding the shaft E in such a way as to assist in forcing the material placed within the hopper downward within the basket D. The upper part of the chamber formed by the wall A and the hopper H is provided with an outlet K, the lower end of which dips into the tank of water L, so as to be sealed thereby. The upper edge of the basket D is provided with a horizontal flange D' which extends over a horizontal flange D³ carried by the wall A, so as to substantially prevent matter, rising above the edge of the basket, from passing between the upright wall of the basket D and the wall A. A pipe M extends through the wall A and into the basket D where it is provided with orifices $m$. Through this pipe is supplied a mixture of gas and air from pipes N and O, said pipes being provided with valves $n$ and $o$ for controlling the supply of gas and air in such a way that the proportions shall be those necessary for the burning of the gas within the furnace without the leaving of any free oxygen.

In carrying out my method with the apparatus above described, I feed a mixture of materials of high and low melting temperatures into the hopper H, meanwhile revolving the basket D by means of power applied to pulley G, the gas and air mixture being supplied and ignited so as to raise the temperature within the furnace to that required for melting the incombustible material of low melting temperature but not as high as that required for melting the incombustible material of high melting temperature. The revolution of the basket, together with the sleeve connected thereto bearing the pins J, feeds the material placed in the hopper downward into the basket where it is subjected to the action of heat and centrifugal force with the result that as soon as the material of low melting temperature is melted, it is thrown off by centrifugal force through the perforations $d$ in the sides of the basket. This molten material falls into the trough B and is carried thereby to the spout C from which it discharges into the crucible or mold P provided for its reception. The matter which is fed into the hopper H being pressed downward crowds the incombustible material of high melting temperature which is in the basket D upward until it passes above the flange D', at which time the centrifugal force throws it outward to the exit K provided for that purpose by which it is conducted into the tank L. As before stated, the tank L and the trap B' act to prevent the exit of products of combustion through either of these orifices. The products of combustion due to the burning of the gas and air mixture within the furnace can find exit only through the opening in the hopper H and in passing out through the hopper constitute a gas seal and prevent the ingress of air at that point. The atmosphere within the furnace is therefore entirely deoxidized and no oxidation of the material treated takes place within the furnace. This sealing of openings for feeding the furnace and for removing such material as is removed during the continuous operation is of great importance where there is danger of loss being incurred by oxidation and constitutes a valuable feature of my invention apart from the particular separating means described.

My process permits of various modifications such as would suggest themselves to those skilled in the art, thus the heat may be generated in other ways than that described, and force other than centrifugal force may be relied upon as the separating force, and moreover a deoxidized atmosphere is not necessary in treating materials which are not subject to oxidation.

I have not shown means for continuously feeding material to the hopper H or continuously removing the material from the tank L, since any suitable means known to the art can be used for those purposes.

In separating solder from tin cans by my process not only are the heated solder and steel kept from oxidizing, but what is more important the thin coating of tin upon the steel is kept from oxidizing. If the heated atmosphere were not deoxidized, the tin coating would be completely oxidized and destroyed so far as its subsequent recovery is concerned.

The apparatus described but not claimed and shown is claimed in a pending application, Serial No. 201,230, dated April 2nd, 1904, Patent Number 800,222, dated September 26, 1905, of which this application is a division.

What I claim is:—

1. The improvement in the process of separating a material of low melting temperature from a material of higher melting temperature, one of which at least is oxidizable, which consists in first producing by combustion a deoxidized atmosphere artificially heated by said combustion to a temperature at least equal the low melting temperature and then subjecting the materials to be treated to said atmosphere and then cooling said material of high melting temperature to a substantially non-oxidizing temperature prior to exposure to the air.

2. The improved process of separating an incombustible material of low melting temperature from an incombustible material of high melting temperature, one of which materials at least is oxidizable and both of which are solid at normal temperature, which consists in producing by combustion a deoxidized atmosphere artificially heated by said combustion to a temperature at least equal to the low melting temperature but less than the high melting temperature, subjecting the materials to said atmosphere and thereby reducing one of said materials to a molten condition and simultaneously also subjecting them to an artificial mechanical separating force and then cooling said material of high melting temperature to a substantially non-oxidizing temperature prior to exposure to the air.

3. The improved process of separating incombustible materials of low melting temperature from incombustible materials of high melting temperature, one of which materials, at least, is oxidizable, which consists in producing a deoxidized atmosphere artificially raised to a temperature at least equal to the low melting temperature, but less than the high melting temperature, continuously passing the materials through said atmosphere, and meanwhile rapidly revolving said materials so as to subject them to centrifugal force, and separately collecting the materials thus thrown off.

4. The improved process of separating incombustible materials of low melting temperature from incombustible materials of high melting temperature, of which at least one is oxidizable, which consists in continuously feeding such materials into a deoxidized atmosphere, artificially heated to a temperature at least equal to the low melting temperature, but less than the high melting temperature, and while in this atmosphere acting upon them by a mechanical separating force, collecting the materials of low melting temperature at one point, and discharging the materials of high melting temperature at another point.

5. The improved process of separating incombustible materials of low melting temperature from incombustible materials of high melting temperature which consists in continuously feeding the materials to be acted upon into a furnace normally sealed except as to its receiving opening, subjecting said materials to artificial heat having a temperature at least equal to the low melting temperature but less than the high melting temperature, meanwhile acting upon said materials by a mechanical separating force, and collecting the melted material separated thereby at one point and continuously discharging the unmelted material at another point, and causing the products of combustion to pass through the orifice where the material is supplied and thereby when the apparatus is in operation sealing said orifice so as to prevent the entrance of air.

6. The improved process of separating incombustible materials of low melting temperature from incombustible materials of high melting temperature which consists in continuously feeding said materials into a deoxidized atmosphere produced by combustion and artificially heated by said combustion to a temperature at least equal to the low melting temperature, and while in this atmosphere acting upon them by a mechanical separating force, collecting said low melting material at one point and continuously discharging said high melting material at another point and cooling said material of high melting temperature to a substantially non-oxidizing temperature prior to exposure to an oxidizing medium.

7. The improved process of separating incombustible materials of low melting temperature from incombustible materials of high melting temperature which consists in continuously feeding said materials into a deoxidized atmosphere having a temperature at least equal to the low melting temperature and while in this atmosphere acting upon them by a separating force, collecting said low melting material at one point and discharging said material of high melting temperature at another point and subjecting the same to a cooling bath prior to exposure to the air.

Signed at New York, N. Y., this 27th day of September, 1904.

MEREDITH LEITCH.

Witnesses:
H. M. SKINNER,
L. VREELAND.